J. T. Martin.
Camel & Floating Dock.
No. 77,501. Patented May 5, 1868.
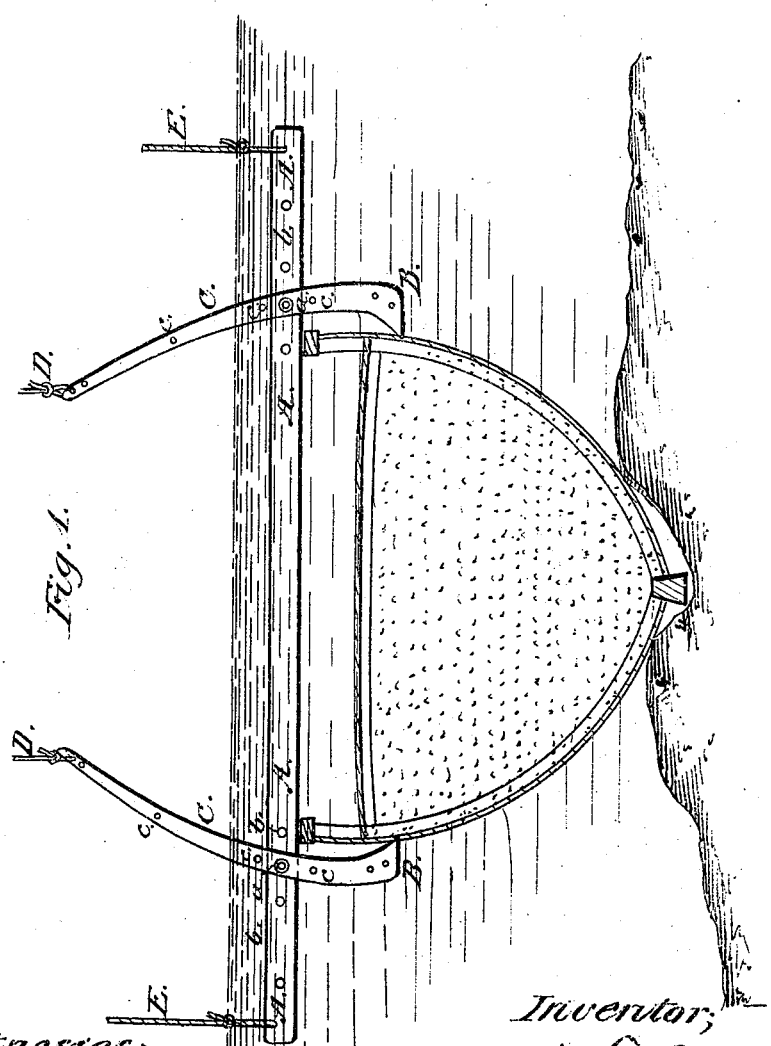

United States Patent Office.

JOSEPH T. MARTIN, OF NEW YORK, N. Y.

Letters Patent No. 77,501, dated May 5, 1868.

---

IMPROVEMENT IN GRAPPLE FOR SUNKEN VESSELS.

---

*The Schedule referred to in these Letters Patent and making part of the same.*

---

TO ALL WHOM IT MAY CONCERN:

Be it known that I, JOSEPH T. MARTIN, of the city, county, and State of New York, have invented a new and improved Marine Grapple; and I do hereby declare that the following is a full, clear, and exact description thereof, which will enable others skilled in the art to make and use the same, reference being had to the accompanying drawings, forming part of this specification, in which—

Figure 1 represents a side view of my improved marine grapple.

Figure 2 is an end view of the same.

Similar letters of reference indicate corresponding parts.

This invention relates to a new marine grapple, which is a simplified and improved modification of that for which Letters Patent were granted me on the eleventh day of July, 1854.

The present invention consists in arranging the claws or hooks on a single bar or beam, which is perforated or slotted, so that the claws can be adjusted on it to adapt them to vessels of suitable breadth. By thus doing away with the extension-beam, that was used in the aforesaid-patented device, the apparatus is not only made considerably cheaper, but also much stronger.

A, in the drawing, represents a beam of iron, wood, or other suitable material, made of suitable length and cross-section.

B B are the claws. They are formed on the lower ends of bars C C, that are pivoted to the beam by means of suitable pivots, *a a*, as shown.

The beam A has a series of holes, *b b*, or a slot, or is otherwise so arranged that the pivots *a a* can be brought together or further apart, as may be desired. The bars C C are in a similar manner, by means of holes, *c c*, slots, or other devices, so arranged that they can be adjusted up and down on the beam, for the purpose of bringing the hooks B to a higher or lower portion of the vessel, as may be desired.

The device is thus applicable to broad or narrow, to deep or flat vessels, and is operated by means of chains or ropes, D D, which are fastened to the upper ends of the lever C.

From ropes or chains, E, which are fastened to the ends of the beam A, the whole device is suspended. The operation of the apparatus will be clearly understood by reference to fig. 1. Each lever C may carry any desired number of claws B, or may have one single claw at its lower end.

Having thus described my invention, I claim as new, and desire to secure by Letters Patent—

A marine grapple, consisting of a solid beam, A, to which the levers C, carrying the grappling-jaws B, are pivoted, when said bars are adjustable towards or away from each other, on the beam A, and also up-and-down adjustable on the same, substantially as and for the purpose herein shown and described.

JOSEPH T. MARTIN.

Witnesses:
WM. F. MCNAMARA,
ALEX. F. ROBERTS.